(12) United States Patent
Ogura et al.

(10) Patent No.: US 8,928,790 B2
(45) Date of Patent: Jan. 6, 2015

(54) SOLID-STATE IMAGING APPARATUS

(71) Applicant: Canon Kabushiki Kaisha, Tokyo (JP)

(72) Inventors: Masanori Ogura, Kawasaki (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/828,786

(22) Filed: Mar. 14, 2013

(65) Prior Publication Data

US 2013/0194470 A1    Aug. 1, 2013

Related U.S. Application Data

(62) Division of application No. 12/692,848, filed on Jan. 25, 2010, now Pat. No. 8,477,224.

(30) Foreign Application Priority Data

Jan. 30, 2009    (JP) ................................. 2009-020135

(51) Int. Cl.
| | |
|---|---|
| H04N 3/14 | (2006.01) |
| H04N 5/335 | (2011.01) |
| H04N 5/357 | (2011.01) |
| H04N 5/359 | (2011.01) |
| H04N 5/361 | (2011.01) |
| H04N 5/374 | (2011.01) |

(52) U.S. Cl.
CPC ............. *H04N 5/357* (2013.01); *H04N 5/3595* (2013.01); *H04N 5/361* (2013.01); *H04N 5/374* (2013.01)
USPC .......................................... 348/300; 348/241

(58) Field of Classification Search
USPC .................................................. 348/241, 300
See application file for complete search history.

(56) References Cited

U.S. PATENT DOCUMENTS

| | | | |
|---|---|---|---|
| 5,121,225 A | 6/1992 | Murata et al. ................. 358/471 |
| 5,475,211 A | 12/1995 | Ogura et al. ................ 250/208.1 |
| 5,698,892 A | 12/1997 | Koizumi et al. .............. 257/620 |
| 6,188,094 B1 | 2/2001 | Kochi et al. .................... 257/232 |
| 6,538,418 B2 | 3/2003 | Miyazaki ...................... 323/284 |
| 6,670,990 B1 | 12/2003 | Kochi et al. .................... 348/310 |
| 6,960,751 B2 | 11/2005 | Hiyama et al. ............. 250/208.1 |
| 7,016,089 B2 | 3/2006 | Yoneda et al. ................ 358/482 |
| 7,110,030 B1 | 9/2006 | Kochi et al. ................... 348/308 |
| 7,227,208 B2 | 6/2007 | Ogura et al. .................. 257/292 |
| 7,321,110 B2 | 1/2008 | Okita et al. ................ 250/208.1 |

(Continued)

FOREIGN PATENT DOCUMENTS

| | | |
|---|---|---|
| JP | 2004-312472 | 11/2004 |
| JP | 2005-217771 | 8/2005 |

(Continued)

*Primary Examiner* — Anthony J Daniels
(74) *Attorney, Agent, or Firm* — Fitzpatrick, Cella, Harper & Scinto

(57) ABSTRACT

Provided is a solid-state imaging apparatus that is capable of preventing a harmful influence due to noise generated in a control line. The solid-state imaging apparatus includes: a plurality of pixels each including a photoelectric conversion unit for photoelectric converting to generate a signal; control lines for supplying control signals for driving the pixels; driving buffers for driving the control lines; and switching units for switching between a first path for supplying power source voltages from power source circuits to power source terminals of the driving buffers and a second path for supplying power source voltages from capacitors to the power source terminals of the driving buffers.

10 Claims, 12 Drawing Sheets

(56) References Cited

U.S. PATENT DOCUMENTS

| | | | |
|---|---|---|---|
| 7,324,144 B1 | 1/2008 | Koizumi | 348/294 |
| 7,348,615 B2 | 3/2008 | Koizumi | 257/292 |
| 7,408,210 B2 | 8/2008 | Ogura et al. | 257/233 |
| 7,429,764 B2 | 9/2008 | Koizumi et al. | 257/292 |
| 7,456,880 B2 | 11/2008 | Okita et al. | 348/243 |
| 7,460,162 B2 | 12/2008 | Koizumi et al. | 348/294 |
| 7,460,164 B2 | 12/2008 | Hyama et al. | 348/300 |
| 7,466,003 B2 | 12/2008 | Ueno et al. | 257/462 |
| 7,514,732 B2 | 4/2009 | Okita et al. | 257/292 |
| 7,525,585 B2 | 4/2009 | Murakami et al. | 348/294 |
| 7,538,810 B2 | 5/2009 | Koizumi et al. | 348/308 |
| 7,550,793 B2 | 6/2009 | Itano et al. | 257/239 |
| 7,554,591 B2 | 6/2009 | Kikuchi et al. | 348/308 |
| 7,605,415 B2 | 10/2009 | Koizumi et al. | 257/291 |
| 7,629,568 B2 | 12/2009 | Koizumi et al. | 250/214 R |
| 7,638,826 B2 | 12/2009 | Hiyama et al. | 257/291 |
| 7,675,015 B2 | 3/2010 | Nam et al. | 250/208.1 |
| 7,679,658 B2 | 3/2010 | Sakurai et al. | 348/243 |
| 7,683,304 B2 | 3/2010 | Nam et al. | 250/208.1 |
| 7,893,978 B2 | 2/2011 | Hiyama et al. | 348/300 |
| 2004/0085048 A1 | 5/2004 | Tateishi | 323/224 |
| 2006/0044439 A1 | 3/2006 | Hiyama et al. | 348/300 |
| 2006/0157759 A1 | 7/2006 | Okita et al. | 257/292 |
| 2007/0052831 A1 | 3/2007 | Ogura et al. | 348/308 |
| 2008/0024630 A1 | 1/2008 | Hiyama et al. | 348/241 |
| 2008/0036891 A1 | 2/2008 | Ono et al. | 348/308 |
| 2008/0042047 A1 | 2/2008 | Nam et al. | 250/208.1 |
| 2008/0055445 A1 | 3/2008 | Hatano et al. | 348/302 |
| 2008/0062294 A1 | 3/2008 | Koizumi et al. | 348/300 |
| 2008/0062295 A1 | 3/2008 | Fujimura et al. | 348/301 |
| 2008/0062296 A1 | 3/2008 | Ogura et al. | 348/308 |
| 2008/0122941 A1 | 5/2008 | Kikuchi et al. | 348/222.1 |
| 2009/0073291 A1 | 3/2009 | Yoneda et al. | 348/273 |
| 2009/0073298 A1 | 3/2009 | Ogura et al. | 348/308 |
| 2009/0207293 A1 | 8/2009 | Ryoki et al. | 348/308 |
| 2009/0213260 A1 | 8/2009 | Koizumi et al. | 348/308 |
| 2009/0219429 A1 | 9/2009 | Ogura et al. | 348/308 |
| 2009/0225212 A1 | 9/2009 | Kikuchi et al. | 348/308 |
| 2010/0002114 A1 | 1/2010 | Ogura et al. | 348/301 |
| 2010/0025570 A1 | 2/2010 | Koizumi et al. | 250/208.1 |
| 2010/0052765 A1* | 3/2010 | Makino | 327/384 |
| 2010/0060754 A1 | 3/2010 | Ogura et al. | 348/241 |
| 2010/0060762 A1 | 3/2010 | Takada et al. | 348/300 |
| 2010/0060763 A1 | 3/2010 | Hiyama et al. | 348/300 |
| 2010/0066881 A1 | 3/2010 | Ryoki et al. | 348/302 |
| 2014/0078363 A1* | 3/2014 | Amikawa | 348/300 |

FOREIGN PATENT DOCUMENTS

| | | |
|---|---|---|
| JP | 2006-135997 A | 5/2006 |
| JP | 2007-060500 | 3/2007 |
| JP | 2008-042247 A | 2/2008 |
| JP | 2008-085994 | 4/2008 |
| JP | 2008-136047 | 6/2008 |
| JP | 2008-312182 | 12/2008 |
| JP | 2010-098621 A | 4/2010 |

* cited by examiner

SOLID-STATE IMAGING APPARATUS

CROSS REFERENCE TO RELATED APPLICATION

This application is a divisional of U.S. application Ser. No. 12/692,848 filed on Jan. 25, 2010, the entire disclosure of which is hereby incorporated by reference herein.

BACKGROUND OF THE INVENTION

1. Field of the Invention

The present invention particularly relates to a solid-state imaging apparatus that is widely employed for an image input device of a movable communication terminal such as a video camera, a digital still camera, an image scanner or a portable phone.

2. Description of the Related Art

Japanese Patent Application Laid-Open No. 2008-085994 (hereinafter, referred to as Patent Document 1) describes a method of suppressing disturbance noise from being superimposed on a signal in a solid-state imaging apparatus. The solid-state imaging apparatus includes: a pixel array in which a plurality of pixels is arrayed in a row direction and a column direction; a plurality of reading out circuits for reading out signals from the pixels for respective columns in the pixel array; and a control portion for controlling each of the plurality of reading out circuits. Each of the plurality of reading out circuits includes: a holding portion for holding a reference voltage supplied from an external side; an operational amplification portion for amplifying the signals from the pixels for the respective columns based on the reference voltage held in the holding portion; and a disconnection portion for electrically disconnecting the holding portion from the external side. The control portion controls the disconnection portion to electrically disconnect the holding portion from the external side when the operational amplification portion amplifies the signals from the pixels for the respective columns.

As described above, even when disturbance noise is mixed in the reference voltage supplied from the external side, the holding portion holds the reference voltage, and then is disconnected from the external side, whereby the disturbance noise is prevented from being input to the operational amplification portion.

The problem and the principle of solving means described in Patent Document 1 are briefly described. FIG. 11 is a structural diagram of the solid-state imaging apparatus described in Patent Document 1. FIG. 12 is a timing chart for reading out the signals.

At a time t0, a control line PSEL1 becomes High LEVEL, so that a MOS transistor 5105 is turned on. At substantially the same time, a control line PRES1 becomes Low LEVEL, so that a MOS transistor 5103 is turned off. Also at substantially the same time, a control signal PCVR becomes Low LEVEL, so that a MOS transistor 5045 is turned off. In addition, a control signal PCOR becomes High LEVEL, so that a MOS transistor 5041 is turned on. In this case, a gate of a MOS transistor 5104 is in a floating state, and a signal at the gate of the MOS transistor 5104 is input to a capacitor 5031 through a common vertical output line 5106 as a noise signal N of the pixel. It should be noted that, at this time, the MOS transistor 5041 is turned on.

After that, at a time t1, the control signal PCOR is set to be Low LEVEL, so that the MOS transistor 5041 is turned off, whereby the noise signal N is held in the capacitor 5031.

Next, at a time t2, a control signal PTX1 turns on a MOS transistor 5102. Then, an optical signal S that is photoelectrically converted by a photoelectric conversion unit 5101 is input to the gate of the MOS transistor 5104, and an S+N signal obtained by superimposing the optical signal S on the noise signal N of the pixel is input to the capacitor 5031 through the common vertical output line 5106. The S+N signal is clamped at the level of the noise signal N by the capacitor 5031, a vertical line amplifier 5040 and a switch 5041, and hence an S+N−N=S signal can be extracted. At the same time, a signal obtained by adding a gain G having a ratio of the capacitor 5031 to a capacitor 5042 to the optical signal S and superimposing the resultant signal on a reference voltage VREF, that is, a signal of G×S+VREF is output from the vertical line amplifier 5040.

Further, at a time t3, a MOS transistor 5032 is turned on, so that the output from the vertical line amplifier 5040 is written into a capacitor 5033, to thereby hold the signal of G×S+VREF obtained at the time t2.

Here, a solid line of VREF in FIG. 12 represents an ideal reference voltage, but in actuality, the reference voltage becomes a signal as indicated by a broken line in FIG. 12 due to an influence of disturbance noise. It is considered a case where the MOS transistor 5045, a capacitor 5046 and a control signal such as the control signal PCVR are not provided and the reference voltage VREF is directly input to a positive input terminal of the vertical line amplifier 5040. In this case, a difference α−β between VREF+α at the time t0 and VREF+β at the time t4 is output from the vertical line amplifier 5040 as a noise signal. A signal that is actually held in the capacitor 5033 is G×(S+α−β)+VREF+β. The gain G is added to the difference α−β that is disturbance noise of the reference voltage VREF, so that noise is emphasized. The emphasized noise is generated for each row, and is visually observed as random noise in a lateral-line pattern. This noise is referred to as lateral line noise.

In Patent Document 1, the signal of the reference voltage VREF is synchronized with the control signal PCVR, and the signal held in the capacitor 5046 is input to the positive input terminal of the vertical line amplifier 5040. In this manner, even in a case where the disturbance noise as indicated by the broken line is mixed in the reference voltage VREF, the reference voltage VREF+α continues to be held in the capacitor 5046 from the time t0 to the time t4. Accordingly, a difference of the reference voltage VREF between the time t1 at which the noise signal N is held in the capacitor 5031 and the time t4 at which the signal of the vertical line amplifier 5040 is held in the capacitor 5033 is zero. For both the output from the vertical line amplifier 5040 and the signal held in the capacitor 5033, no gain is added to the disturbance noise mixed in the reference voltage VREF. Noise of a regulator that is provided on the external side and generates the reference voltage VREF is a conceivable cause of the disturbance noise described in Patent Document 1. Even in a case where the reference voltage VREF is generated on an internal side of a semiconductor chip on which the solid-state imaging apparatus is formed, noise similar to the above-mentioned disturbance noise occurs due to noise of an internal generator circuit, for example, the regulator.

However, only with the countermeasure described in Patent Document 1, noise is not sufficiently suppressed. It is considered a case where High LEVEL or Low LEVEL of the control lines PRES1(2), PTX1(2) and PSEL1(2) for controlling a pixel portion is unsettled due to noise. In this case, the respective control lines are capacitively coupled with a signal holding portion of the pixel portion via a gate capacitor and a parasitic capacitor of the MOS transistor 5104 that serves as the signal holding portion of the pixel portion, whereby noise is mixed in the signal holding portion of the pixel portion. In a case of reading out the signals as illustrated in FIG. 12, when noise of the signal holding portion of the pixel portion at the time t1 is denoted by A and noise of the signal holding portion of the pixel portion at the time t4 is denoted by B, the signal to be finally held in the capacitor 5033 is obtained as G×(S+A−B)+VREF. According to this expression, noise of the control lines is mixed in the signal holding portion of the pixel portion via the capacitive coupling, and a signal obtained by adding the gain G to a noise difference A−B between the time t1 and the time t4 appears in the capacitor 5033.

"Noise" that unsettles High LEVEL or Low LEVEL of the control lines PRES1(2), PTX1(2) and PSEL1(2) as described above is based on noise of the power sources of driving buffers for driving the control lines. The same problem arises whether the power sources are supplied from the external side of the semiconductor chip on which the solid-state imaging apparatus is formed or are generated on the internal side of the semiconductor chip.

The present invention has an object to provide a solid-state imaging apparatus that is capable of preventing a harmful influence due to noise generated in a control line.

SUMMARY OF THE INVENTION

A solid-state imaging apparatus according to the present invention includes: a plurality of pixels each including a photoelectric conversion unit to generate a signal; a control line for supplying a control signal for driving the pixel; a driving buffer for driving the control line; and a switching unit for switching between a first path for supplying a power source voltage from a power source circuit to a power source terminal of the driving buffer and a second path for supplying a power source voltage from a capacitor to the power source terminal of the driving buffer.

Further, another solid-state imaging apparatus according to the present invention includes: a plurality of pixels each including a photoelectric conversion unit to generate a signal; a control line for supplying a control signal for driving the pixel; a driving buffer for driving the control line; and a switching unit for switching between a first path for supplying a control signal from the driving buffer to the control line and a second path for supplying a control signal from a capacitor to the control line.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

(First Embodiment)

Figure 1:
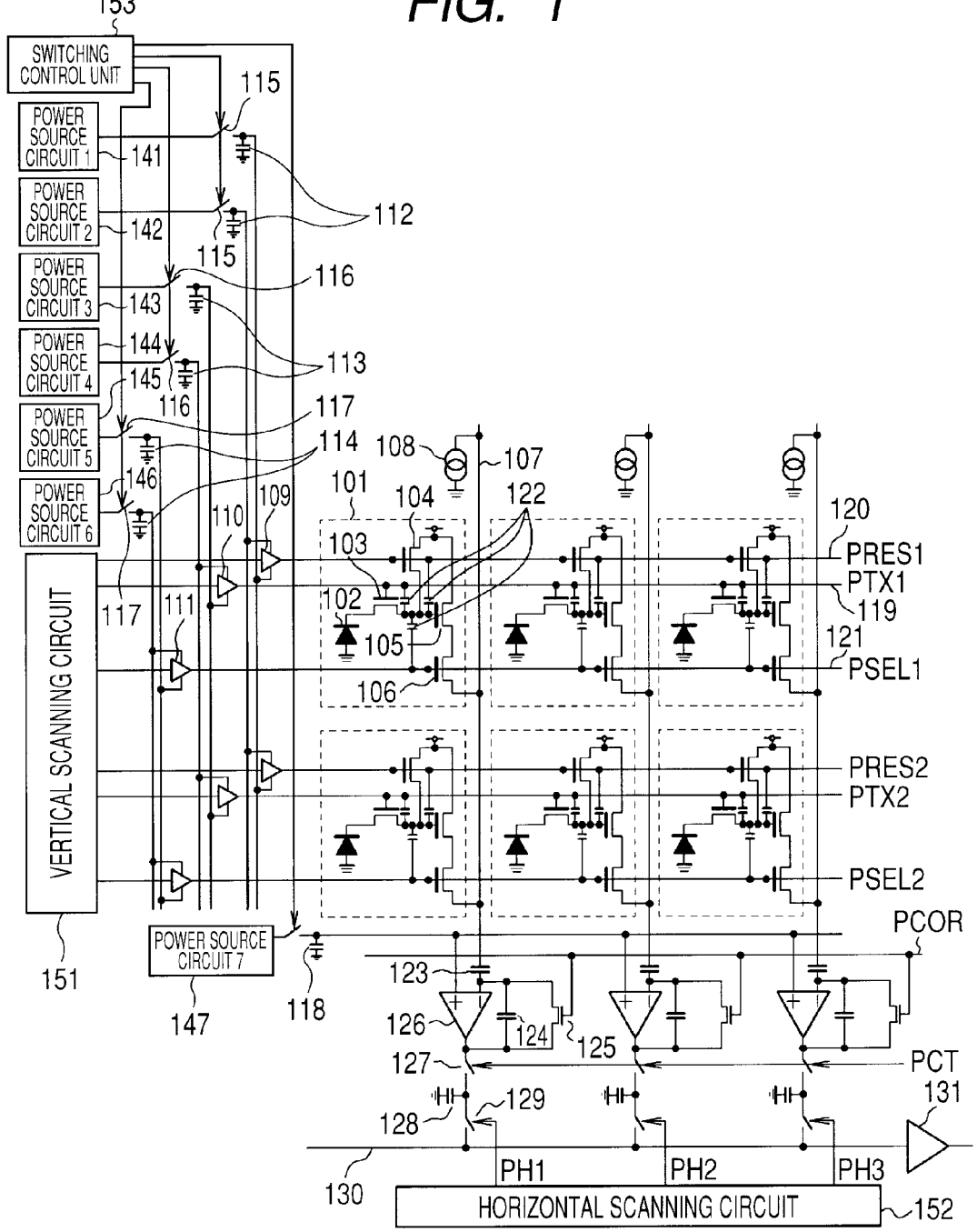
FIG. 1 is a structural diagram of a solid-state imaging apparatus according to a first embodiment of the present invention.

FIG. 1 is an overall structural diagram of a solid-state imaging apparatus according to a first embodiment of the present invention. The solid-state imaging apparatus includes a plurality of pixels 101. Each of the pixels 101 includes: a photoelectric conversion unit 102 for photoelectric converting to generate a signal; a transfer switch 103 that is a MOS transistor for reading out a signal electric charge of the photoelectric conversion unit 102; a reset switch 104 that is a MOS transistor for resetting the signal electric charge; a pixel amplifier 105 that is a source follower MOS transistor; and a selecting switch 106 that is a row selecting MOS transistor for reading out the output from the source follower MOS transistor 105. The plurality of pixels 101 each having such a structure is arranged on a semiconductor substrate in a two dimensional array. The solid-state imaging apparatus further includes a common vertical output line 107 for reading out the output from each of the plurality of pixels 101 and a constant current load 108 for the source follower MOS transistor 106 of each of the plurality of pixels 101. The MOS transistors 103, 104 and 105 are connected to control lines 119, 120 and 121 that are wired in a horizontal direction of the pixels 101. A parasitic capacitor 122 is generated between an input terminal of the source follower MOS transistor 105 and each of the control lines 119, 120 and 121. The solid-state imaging apparatus still further includes driving buffers 109, 110 and 111, a vertical scanning circuit 151, power source circuits 141 to 146 and capacitors 112, 113 and 114. Control signals are supplied from the vertical scanning circuit 151 to the control lines 119, 120 and 121 after being wave-formed by the driving buffers 109, 110 and 111. High-level power sources and low-level power sources of the driving buffers 109, 110 and 111 are supplied from electric charges of the capacitors 112, 113 and 114 that have been supplied from the power source circuits 141 to 146 and accumulated in the capacitors 112, 113 and 114. It is desirable that a reference potential, that is, a ground potential GND of the capacitors 112, 113 and 114 have a low impedance with respect to a reference potential, that is, a ground potential GND of elements forming the pixels 101.

The solid-state imaging apparatus still further includes switching units (turning on/off switches) 115, 116 and 117 for disconnecting between the power source circuits 141 to 146 and the capacitors 112, 113 and 114, capacitors 123, 124 and 128, a column amplifier 126, switches 125 and 127. The capacitors 123 and 124 and the column amplifier 126 are used to add gain to signals read out from the pixels 101 through the common vertical output line 107, and then the signals pass through the switch 127 to be held in the capacitor 128. This corresponds to a function of a so-called column noise reduction circuit and column gain unit. The solid-state imaging apparatus still further includes a switch 129 for connecting/disconnecting the capacitor 128 and a common horizontal output line 130, and a vertical line amplifier 131 for amplifying a signal read out through the common horizontal output line 130.

Figure 2:
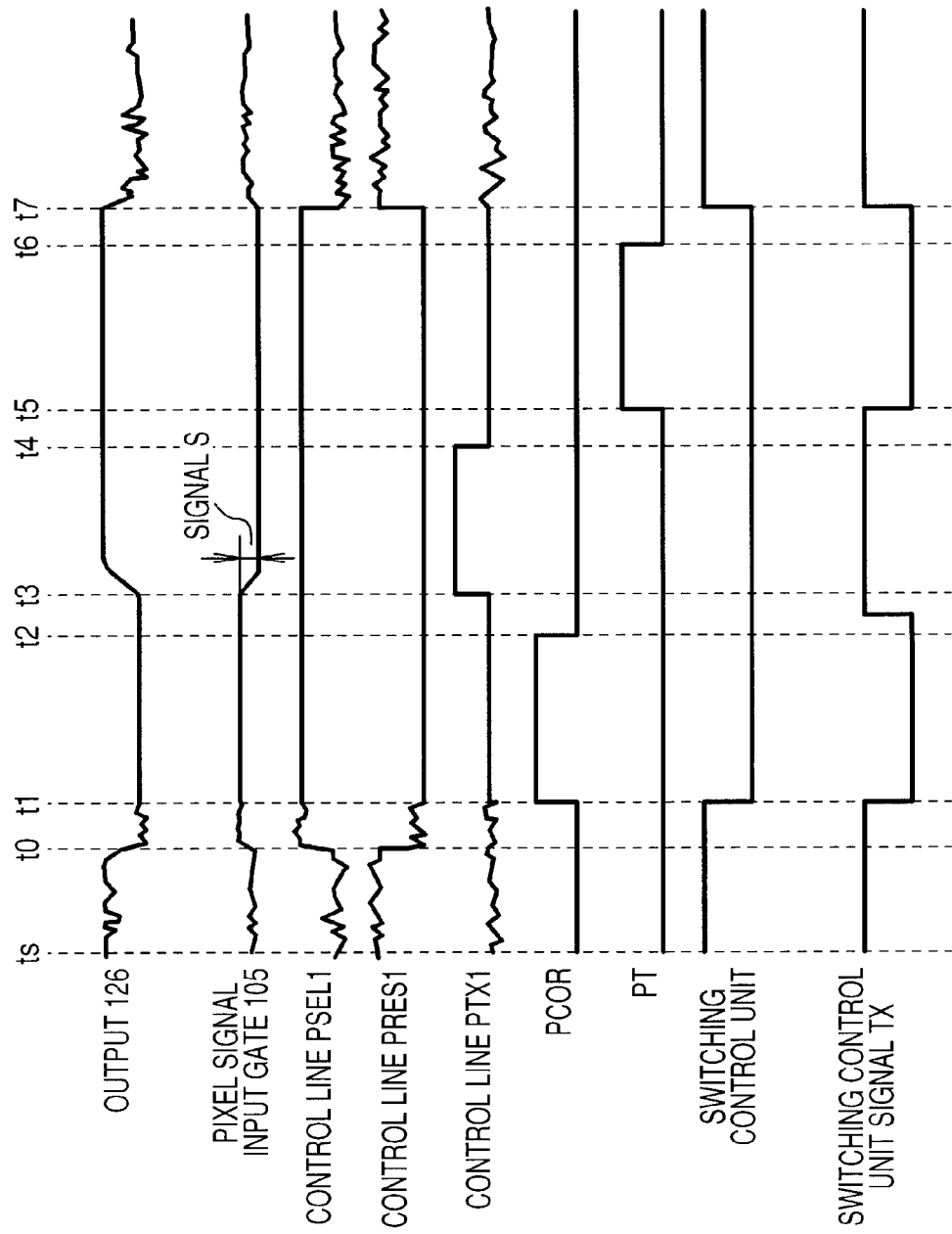
FIG. 2 is a driving timing chart of the solid-state imaging apparatus of FIG. 1.

FIG. 2 is a driving timing chart of the solid-state imaging apparatus of FIG. 1. At a time to, a control line PSEL1 transits from Low LEVEL to High LEVEL to turn on the MOS transistor 106. In addition, a control line PRES1 transits from High LEVEL to Low LEVEL to turn off the MOS transistor 104.

Next, at a time t1, the switching units 115, 116 and 117 are turned off by signals supplied from the switching control unit 153. As a result, the power sources of the driving buffers 109, 110 and 111 are supplied from the capacitors 112, 113 and 114.

During a period between the time t1 and a time t2, a control signal PCOR is in High LEVEL, so that the MOS transistor 125 is turned off and the capacitor 123 and the column amplifier 126 enter a clamped state. A noise signal N at an input gate of the source follower MOS transistor 105, which is in a floating state, included in the pixel is input to the capacitor 123 through the MOS transistor 106 and the common vertical output line 107 as the output from the source follower MOS transistor 105.

After that, during a period between a time t3 and a time t4, the MOS transistor 103 is turned on, and an optical signal S of the photoelectric conversion unit 102 is read out into the input gate of the MOS transistor 105 which is in the floating state. A signal obtained by superimposing the optical signal S on the noise signal N described above is input to the capacitor 123 through the MOS transistors 105 and 106 and the common vertical output line 107, and then a signal voltage corresponding to the optical signal S to which gain is added is read out as an output from the column amplifier 126.

After that, during a period between a time t5 and a time t6, the switch 127 is turned on by a control signal PT, and then the output from the column amplifier 126 is held in the capacitor 128.

Next, at a time t7, the switching units 115, 116 and 117 are turned on by the signals supplied from the switching control unit 153 to supply the power sources to the driving buffers 109, 110 and 111 and to charge the capacitors 112, 113 and 114 from the power source circuits 141 to 146. As a result, the power sources of the driving buffers 109, 110 and 111 are supplied from both the power source circuits 141 to 146 and the capacitors 112, 113 and 114. After that, the switches 129 are sequentially turned on by the horizontal scanning circuit 152 via signals PH1, PH2 and PH3, whereby the signals held in the capacitors 128 pass through the common horizontal output line 130 to be buffered in the vertical line amplifier 131, and the signals are output after gain is added thereto.

Then, the same procedure is repeated in subsequent rows, to thereby scan the signals of the pixels that are two-dimensionally arranged.

During a period between a time is and the time to, the low-level power source of the driving buffer 111 for the control line PSEL1 is connected to the power source circuit 145, and noise of the power source circuit 145 appears in the control line PSEL1. In addition, the low-level power source of the driving buffer 110 for the control line PTX1 is connected to the power source circuit 143, and noise of the power source circuit 143 appears in the control line PTX1. Similarly, noise of the power source circuit 142 appears in the control line PRES1. The input gate of the source follower MOS transistor 105 that holds a pixel signal is capacitively coupled with each of the control lines PSEL1, PRES1 and PTX1 via the parasitic capacitor 122. Therefore, noise of the control lines appears also in the pixel signal held in the input gate of the source follower MOS transistor 105.

Next, during a period between the time t0 and the time t1, noise of the power source circuit 146 appears in the control line PSEL1, noise of the power source circuit 143 appears in the control line PTX1, and noise of the power source circuit 141 appears in the control line PRES1. Due to the capacitive coupling with the control lines, noise of the power source circuits appears also in the pixel signal held in the input gate of the source follower MOS transistor 105. However, at the time t1, the switching units 115, 116 and 117 are turned off by transition of the signals of the switching control unit 153. Accordingly, noise of the power source circuits 141 to 146 is prevented from being transmitted to the driving buffers 109, 110 and 111 for the control lines, and the power sources are supplied to the driving buffers 109, 110 and 111 from the capacitors 112, 113 and 114, respectively. In this way, during a period between the time t1 to the time t7, noise of the power source circuits is prevented from appearing in the control lines, with the result that noise is prevented from appearing also in the pixel signal held in the input gate of the source follower MOS transistor 105.

In this condition, at the time t2, the noise signal N of noise having a fixed pattern due to fluctuations in the elements forming the pixels is held in the capacitor 123 as a clamp reference voltage.

Next, at the time t3, the MOS transistor 103 is turned on to read out the optical signal S of the photoelectric conversion unit 102 into the input gate of the MOS transistor 105, and then the optical signal S is superimposed on the noise signal N described above (an S+N signal is obtained). The obtained signal is similarly input to the capacitor 123. Then, by a clamping operation of the column amplifier 126 and the capacitors 123 and 124, gain is added only to the optical signal S, which is to be read out.

After that, during the period between the time t5 and the time t6, the switch 127 is turned on, whereby the optical signal S to which gain is added is held in the capacitor 128. With the above-mentioned operation, the following effect is obtained during a period from the time t2 at which clamping of the noise signal N is finished to the time t6 at which the optical signal S to which gain is added is held in the capacitor 128. That is, obtained is an effect of preventing noise of the power source circuits 141 to 146 from being transmitted to the pixel signal held in the input gate of the source follower MOS transistor 105 via the driving buffers for the control lines. As a natural result, the same effect can be obtained for pixels arranged in the same row as the pixel 101 that is representatively described here, and hence a high quality image without lateral line noise can be provided. Obviously, even when the control by the switching control unit 153 is performed on at least one of the control lines PRES1, PTX1 and PRES1, such an effect described above can be obtained.

Figure 3A:
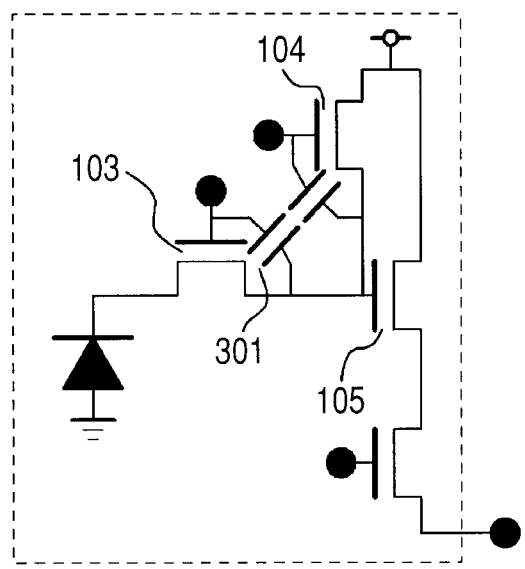
FIG. 3A is a circuit diagram illustrating a parasitic capacitor of a MOS transistor.

In addition, as illustrated in FIG. 3A, a capacitance between the gate and source (drain), such as a capacitance 301, is parasitically formed between the input gate of the source follower MOS transistor 105 and each of the MOS transistors 103 and 104.

Figure 3B:
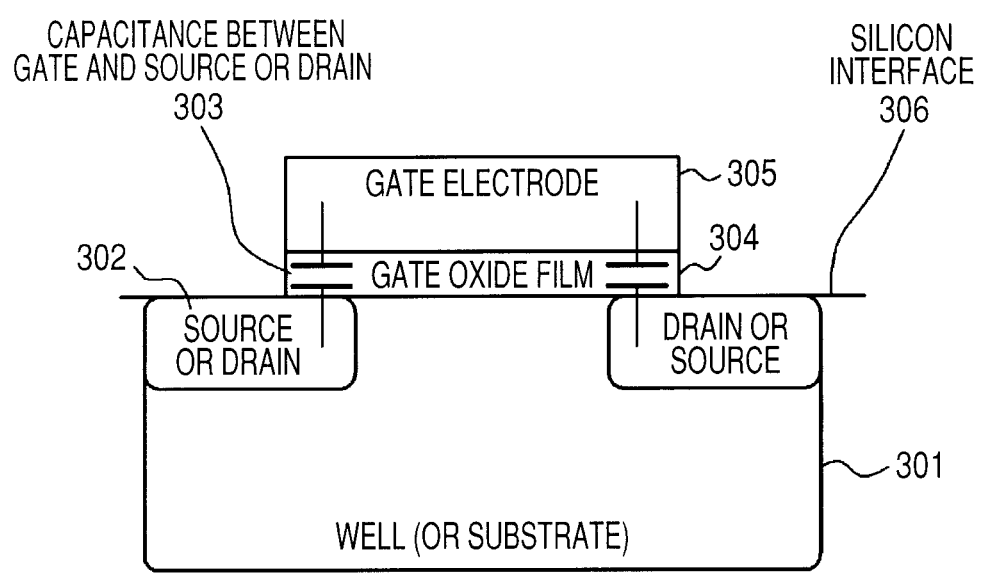
FIG. 3B is a cross sectional view illustrating the parasitic capacitor of the MOS transistor.

FIG. 3B is a cross sectional view of a MOS transistor for describing the capacitance between the gate and source (drain). The MOS transistor of FIG. 3B includes a well or semiconductor substrate 301, a source or drain 302, a capacitance between the gate and source (drain) 303, a gate oxide film 304, a gate electrode 305 and a silicon interface 306. As is apparent from the drawings, the effect of this embodiment is more expected particularly in the control lines 119 and 120 for controlling the MOS transistors 103 and 104 among the control lines.

During other operation than the operation of reading out signals from the pixels and performing a clamping process by the column noise reduction circuit provided on an external side of the pixels, the switching unit 116 may be turned on, and the power sources may be supplied from the power source circuits to the driving buffers. Specifically, it concerns an example in which the levels of the control lines 119 in all the rows are caused to transit so as to turn on the MOS transistors 103 of all the pixels, and in each pixel, the signal of the photoelectric conversion unit 102 is held in a gate input portion of the source follower MOS transistor 105. There may be a case where it is difficult for the capacitor 113 alone to supply the power sources to the driving buffers 109 in all the rows. In this case, the switching unit 116 may be turned on, and the power sources may be supplied also from the power source circuits to the driving buffers. What is important is that noise of the power source circuits is blocked off during a period between the time t1 and the time t6 during which the noise signal N and the S+N signal of the pixel are reduced. In this way, a high quality image without lateral line noise can be provided. This is also true for the other control lines 120 and 121, the other driving buffers 109 and 111 and the other capacitors 112 and 111. In addition, it is desirable that values of the capacitors 112, 113 and 114 be larger than those of parasitic capacitors formed in the control lines 120, 119 and 121.

(Second Embodiment)

Figure 4:
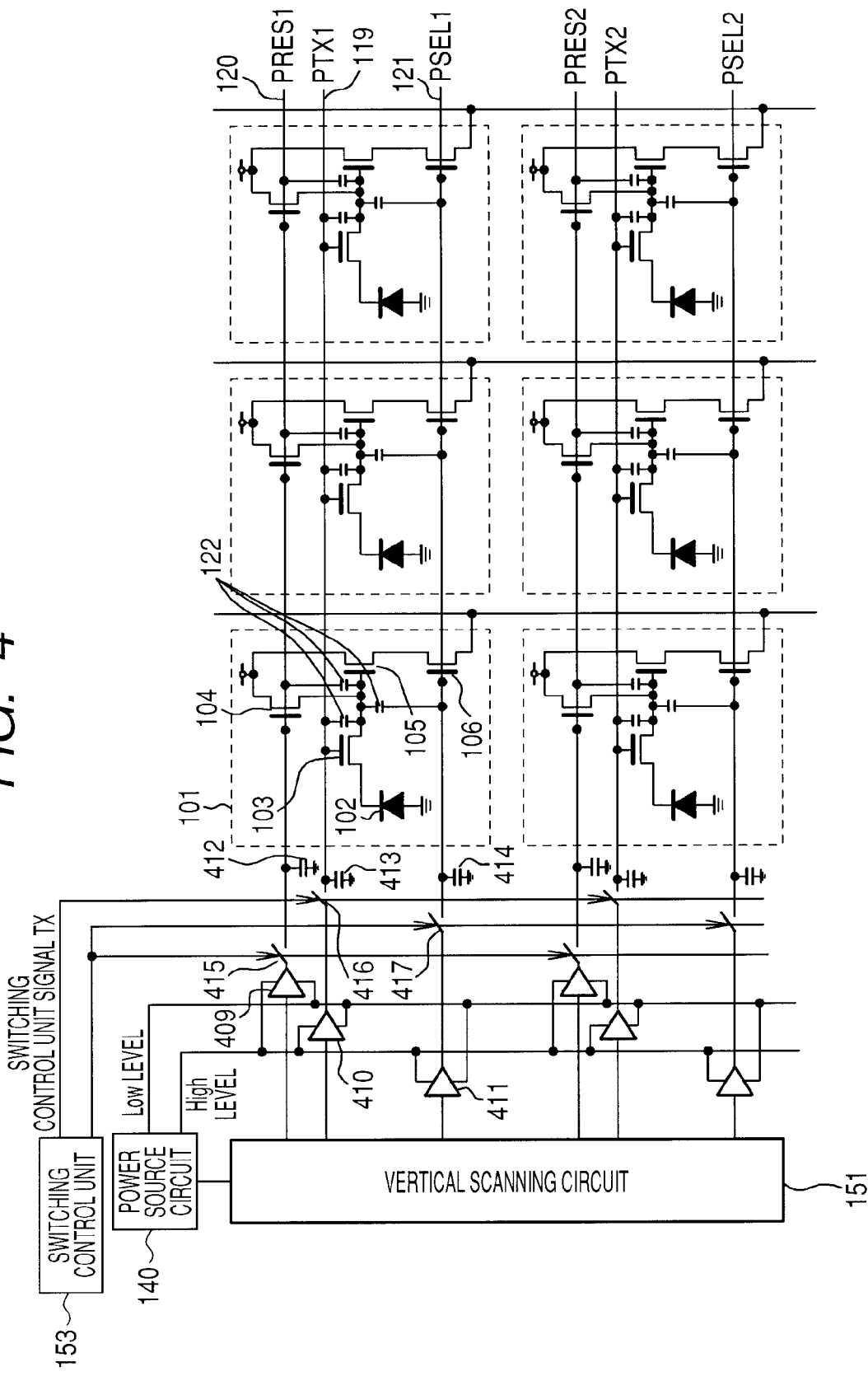
FIG. 4 is a structural diagram of a solid-state imaging apparatus according to a second embodiment of the present invention.

FIG. 4 is a structural diagram of a solid-state imaging apparatus according to a second embodiment of the present invention. Capacitors 412, 413 and 414 are respectively connected to the control lines 119, 120 and 121 that are connected to the MOS transistors of each pixel. Switching units 415, 416 and 417 are inserted between the capacitor 412 and the driving buffer 409, between the capacitor 413 and the driving buffer 410, and between the capacitor 414 and the driving buffer 411, respectively. The switching units 415, 416 and 417 are controlled by the signals of the switching control unit 153. On the other hand, the common vertical output line, the constant current load, the column noise reduction circuit, the column gain unit, the common horizontal output line, the horizontal scanning circuit 152 and the vertical line amplifier are the same as those illustrated in FIG. 1, and hence description thereof is omitted in FIG. 4.

The solid-state imaging apparatus of FIG. 4 has the same driving timing as that of FIG. 2. At the time t0, the control lines 119, 120 and 121 and the capacitors 412, 413 and 414 are driven by the driving buffers 409, 410 and 411, whereby the MOS transistor 104 is turned off and the MOS transistor 105 is turned on. The MOS transistor 103 is turned off during the periods between the time t1 and the time t2 and between the time t5 and the time t6, and is turned on during the period between the time t3 and the time t4.

After that, at the time t1, the switching units 415, 416 and 417 are turned off by the signals of the switching control unit 153, and then the control lines 119, 120 and 121 are held by the capacitors 412, 413 and 414. With the above-mentioned operation, during the period from the time t2 at which clamping of the noise signal N of the pixel is finished to the time t6 at which the optical signal S is held, obtained is an effect of preventing noise of a power source circuit 140 from being transmitted to the input gate of the MOS transistor 105 via the driving buffers for the control lines. As a natural result, the same effect can be obtained for pixels arranged in the same row as the pixel 101 that is representatively described here, and hence a high quality image without lateral line noise can be provided.

Figure 5:
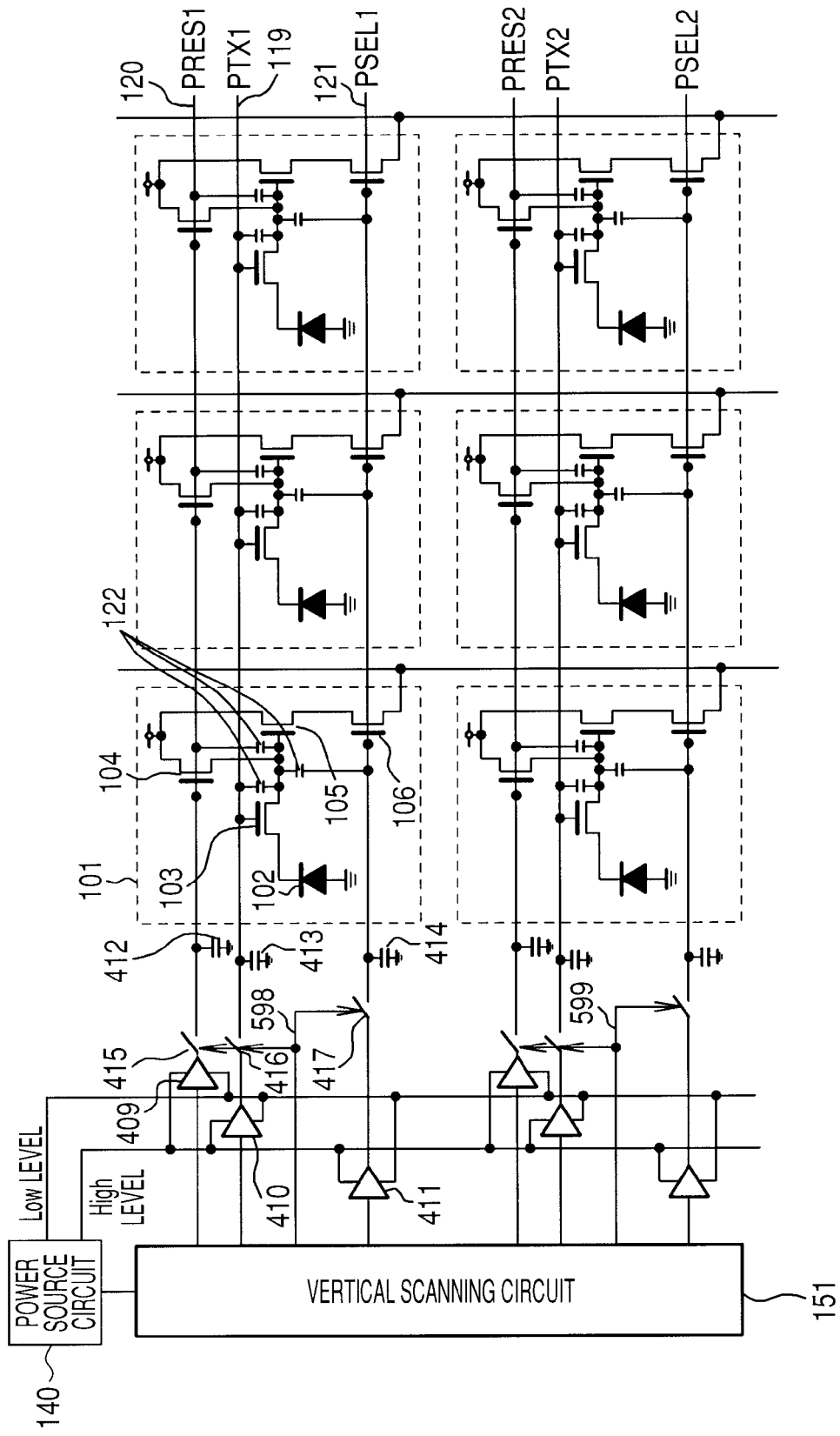
FIG. 5 is another structural diagram of the solid-state imaging apparatus according to the second embodiment of the present invention.

In this embodiment, the control lines PRES1 (120), PSEL1 (121), PSEL2 and PRES2 for controlling all the pixels are controlled by the switching control unit 153 at the same time. However, the present invention is not limited thereto. For example, as illustrated in FIG. 5, the control signals may be supplied from the vertical scanning circuit 151 to the switching units 415, 416 and 417 through signal lines 598 and 599, and only the row from which signals are currently being read out may be controlled. Obviously, even when the control by the switching control unit 153 is performed on any one of the control lines PRES1, PREL1 and PTX1, such an effect described above can be obtained.

Figure 6:
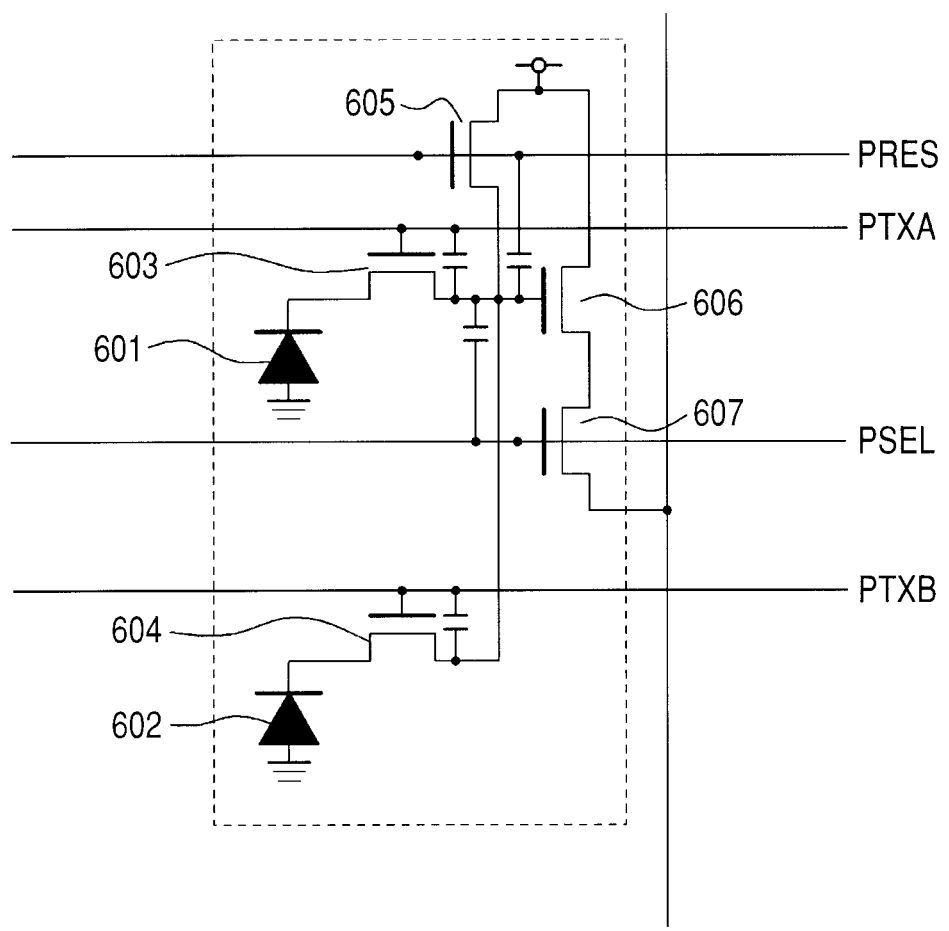
FIG. 6 is a structural diagram of another circuit example for two pixels of each of FIG. 4 and FIG. 5.

FIG. 6 illustrates another structural example for the two pixels 101 of each of FIG. 4 and FIG. 5. A pixel structure of FIG. 6 includes: photoelectric conversion units 601 and 602 for photoelectric converting to generate signals; MOS transistors 603 and 604 for reading out signal electric charges of the photoelectric conversion units 601 and 602; a MOS transistor 605 for resetting the signal electric charges; a source follower MOS transistor 606; and a row selecting MOS transistor 607 for reading out the output from the source follower MOS transistor 606. The two photoelectric conversion units 601 and 602 are paired and the two MOS transistors 603 and 604 are paired, whereas the MOS transistors 605, 606 and 607 are provided independently. In the pixel structure described above, when a signal is read out from the photoelectric conversion unit 601, the power sources of the driving buffers for driving control lines PTXA, PRES and PSEL are supplied from held capacitors within the semiconductor substrate on which the solid-state imaging apparatus is formed. This can prevent noise of the power source circuit 140 from being transmitted to the pixel signal. Similarly, the power source of the driving buffer for driving a control line PTXB for controlling the MOS transistor 604 that serves to read out the signals of the photoelectric conversion unit 602 is also supplied from the held capacitors within the solid-state imaging apparatus. As a result, noise of the power source circuit 140 can be prevented from being transmitted to the pixel signal. The same effect can be obtained also for pixels arranged in the same row as the pixel 101 that is representatively described here, and hence a high quality image without lateral line noise can be provided.

In this embodiment, potentials of the control lines 119, 120 and 121 and the capacitors 412, 413 and 414 are transited to a desired potential by the driving buffers 409, 410 and 411. After that, the driving buffers 409, 410 and 411 and the control line 119, 120 and 121 are disconnected by the switching units 415 to 417, and the potentials of the control lines 119, 120 and 121 are held at the desired potential by using the capacitors 412, 413 and 414. The potentials of the control lines 119 to 121 are driven to the desired potential. After that, the control lines 119 to 121 and the capacitors 412 to 414 are disconnected from the driving buffers 409 to 411. Therefore, because no electric power is consumed after the disconnection, potential variations in the control lines 119 to 121 do not occur. Accordingly, there is an advantage that the control lines 119 to 121 can be controlled in a stable state.

In addition to the above-mentioned pixel structure including the pair of the two photoelectric conversion units 601 and 602 and the pair of the two MOS transistors 603 and 604, even in a case of a pixel structure including a group of three or more photoelectric conversion units and a group of three or more MOS transistors, the same effect can be obtained by adopting the same control method. Even in the pixel structure including the groups of three or more those members, the same effect as that of this embodiment can be obtained by employing such a solution to hold, by using a capacitor, the power source of a driving buffer for driving a control line as in the first embodiment.

(Third Embodiment)

Figure 7:
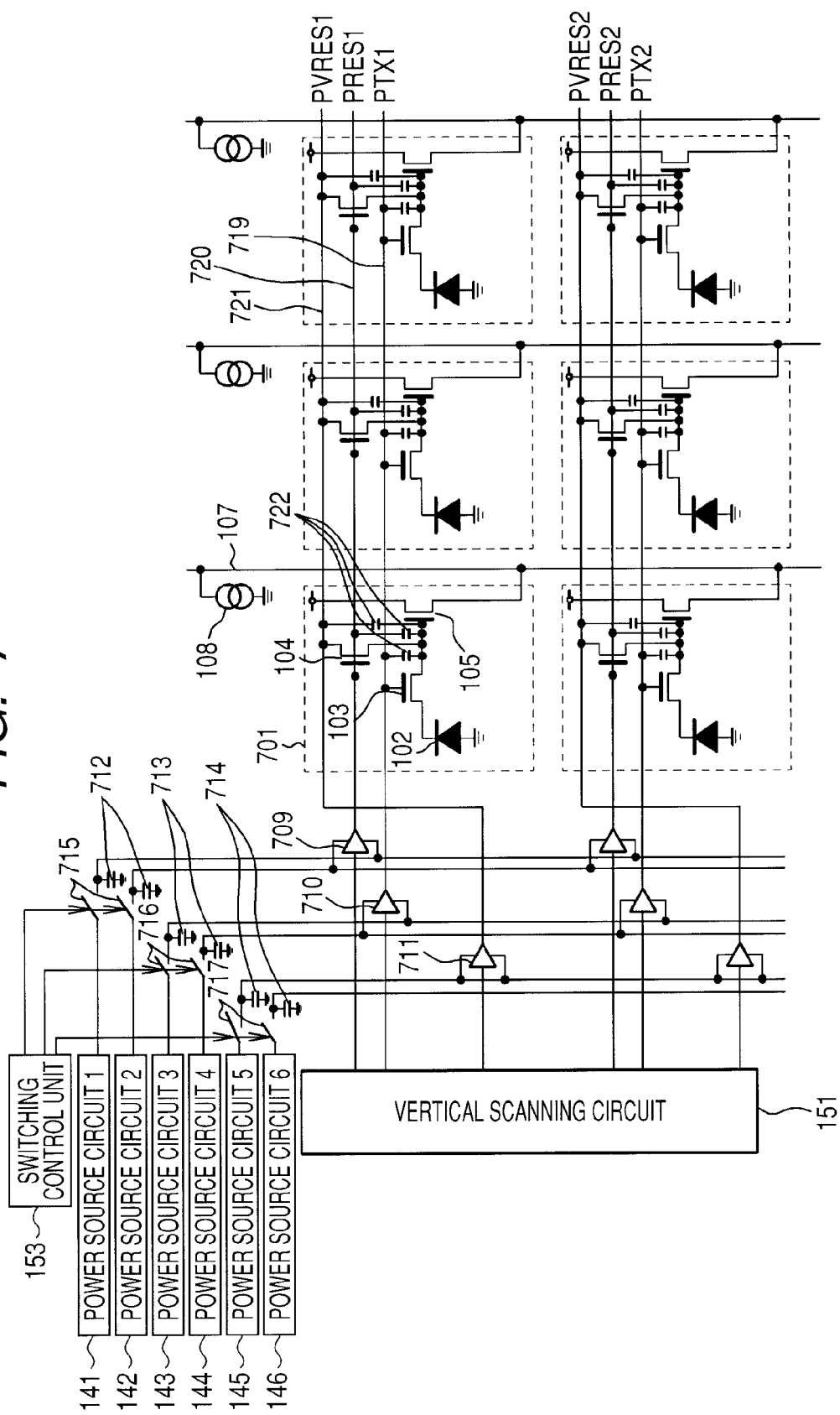
FIG. 7 is a structural diagram of a solid-state imaging apparatus according to a third embodiment of the present invention.
Figure 8:
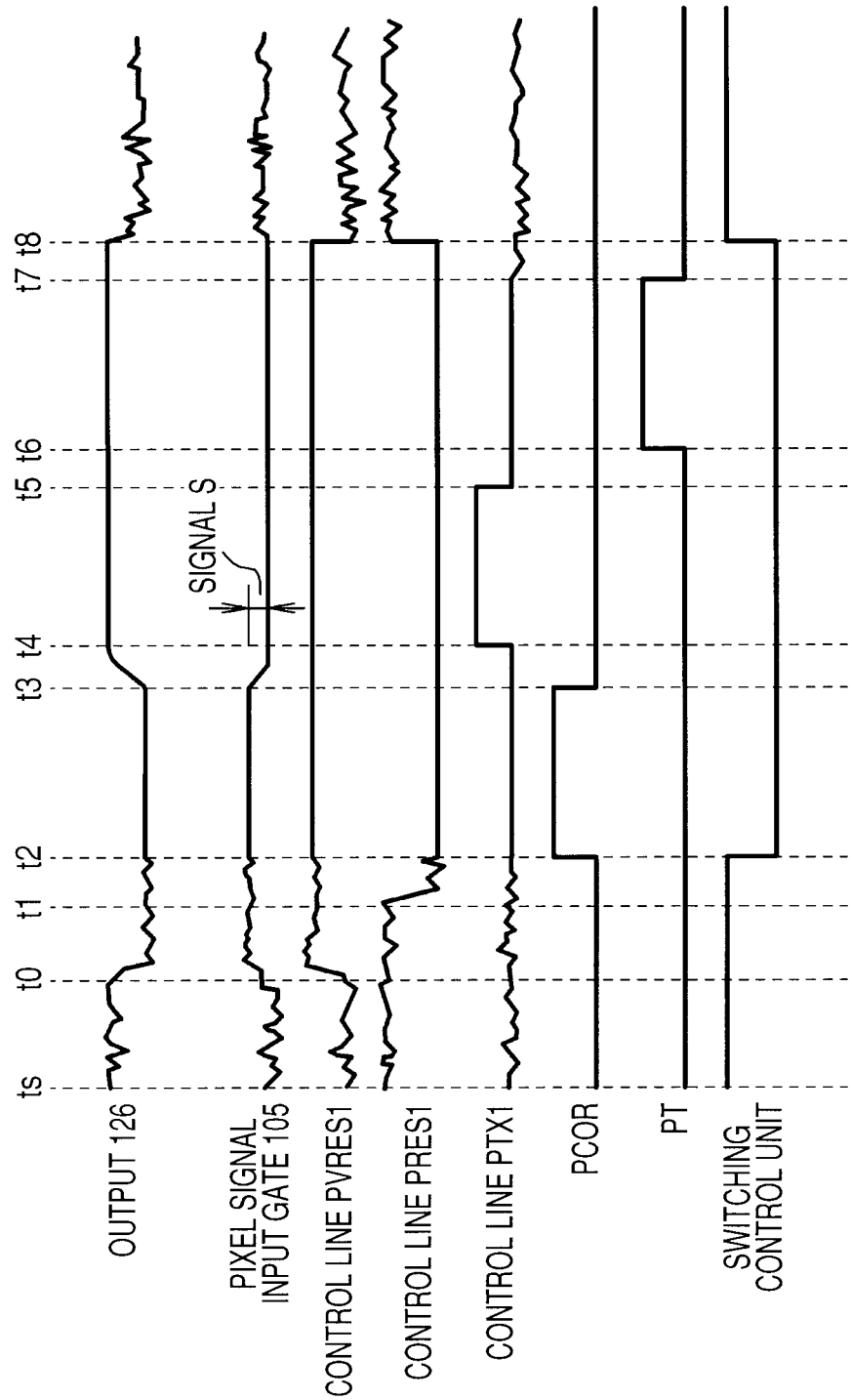
FIG. 8 is a driving timing chart of the solid-state imaging apparatus of FIG. 7.

FIG. 7 is a structural diagram of a solid-state imaging apparatus according to a third embodiment of the present invention. FIG. 7 illustrates a part of a pixel portion of the solid-state imaging apparatus and a part of the vertical scanning circuit 151. FIG. 8 is a driving timing chart of the solid-state imaging apparatus of FIG. 7. In a circuit structural example illustrated in FIG. 7, the pixel does not include the row selecting MOS transistor, and a drain power source of the reset MOS transistor 104 is displaced, to thereby select a row of the pixels. The same reading out circuit and horizontal scanning circuit 152 as those in the first embodiment and the second embodiment are used. Components similar to those of FIG. 1 are denoted by the same reference symbols, and description thereof is omitted.

FIG. 7 is different from FIG. 1 in that a control line PVRES1 (721) for transiting the drain power source of the MOS transistor 104 is wired in the horizontal direction of a pixel 701. The control line 721 controls a reset potential of the reset MOS transistor 104. With regard to the control line PVRES1, too, the gate of the source follower MOS transistor 105 that holds a pixel signal is capacitively coupled therewith via a parasitic capacitor 722. Similarly to the first embodiment, power source terminals of driving buffers 709 and 710 for driving control lines PRES1 (720) and PTX1 (719) are disconnected from the power source circuits 141, 142, 143 and 144 by using capacitors 712 and 713 and switching units 715 and 716, respectively. In the same manner, a power source terminal of a driving buffer 711 for driving the control line PVRES1 is disconnected from the power source circuits 145 and 146 by using a capacitor 714 and a switching unit 717. With this structure, obtained is the effect of preventing noise of the power source circuits 141 to 146 from being transmitted to the pixel signal held in the input gate of the source follower MOS transistor 105 via the driving buffers for the control lines. As a natural result, the same effect as those of the first embodiment and the second embodiment can be obtained for pixels arranged in the same row as the pixel 701 that is representatively described here, and hence a high quality image without lateral line noise can be provided.

Figure 9:
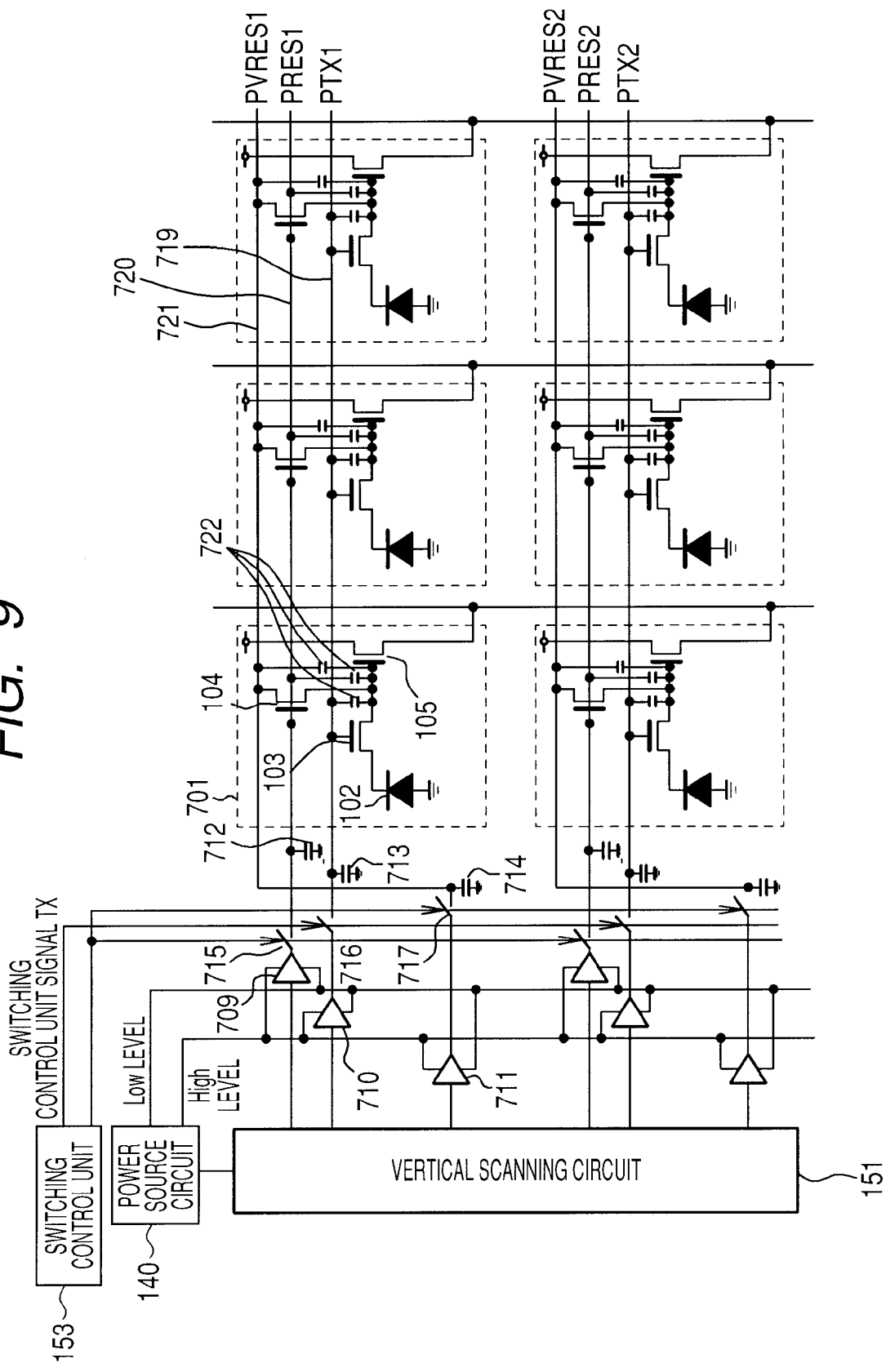
FIG. 9 is another structural diagram of a solid-state imaging apparatus according to the third embodiment of the present invention.

Alternatively, even with a solid-state imaging apparatus illustrated in FIG. 9, a high quality image without lateral line noise can be similarly provided. The difference of FIG. 9 from FIG. 7 is described. In FIG. 9, the power source terminals of the driving buffers 709 to 711 for driving the control lines are not disconnected from the power source circuit 140 by using the capacitors 712 to 714 and the switching units 715 to 717. In FIG. 9, the control lines 719, 720 and 721 are disconnected from the driving buffers 709, 710 and 711 by using the capacitors 712, 713 and 714 and the switching units 715, 716 and 717.

(Fourth Embodiment)

Figure 10:
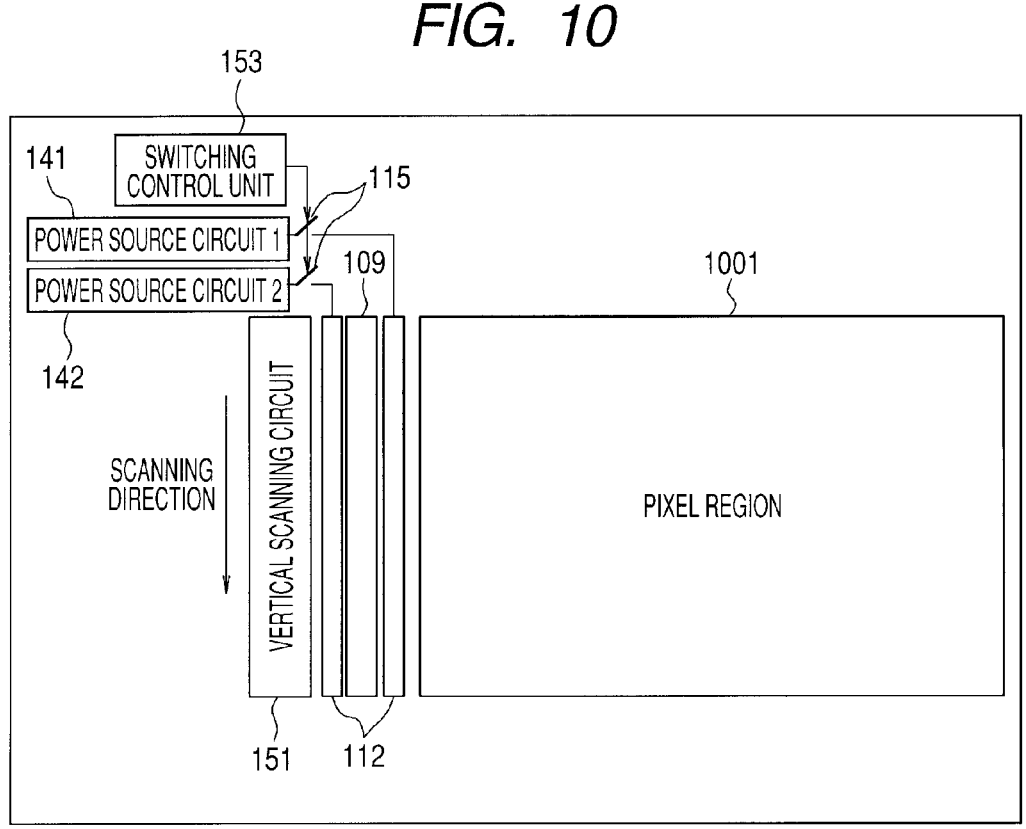
FIG. 10 is an overall arrangement diagram of a solid-state imaging apparatus according to a fourth embodiment of the present invention.
Figure 11:
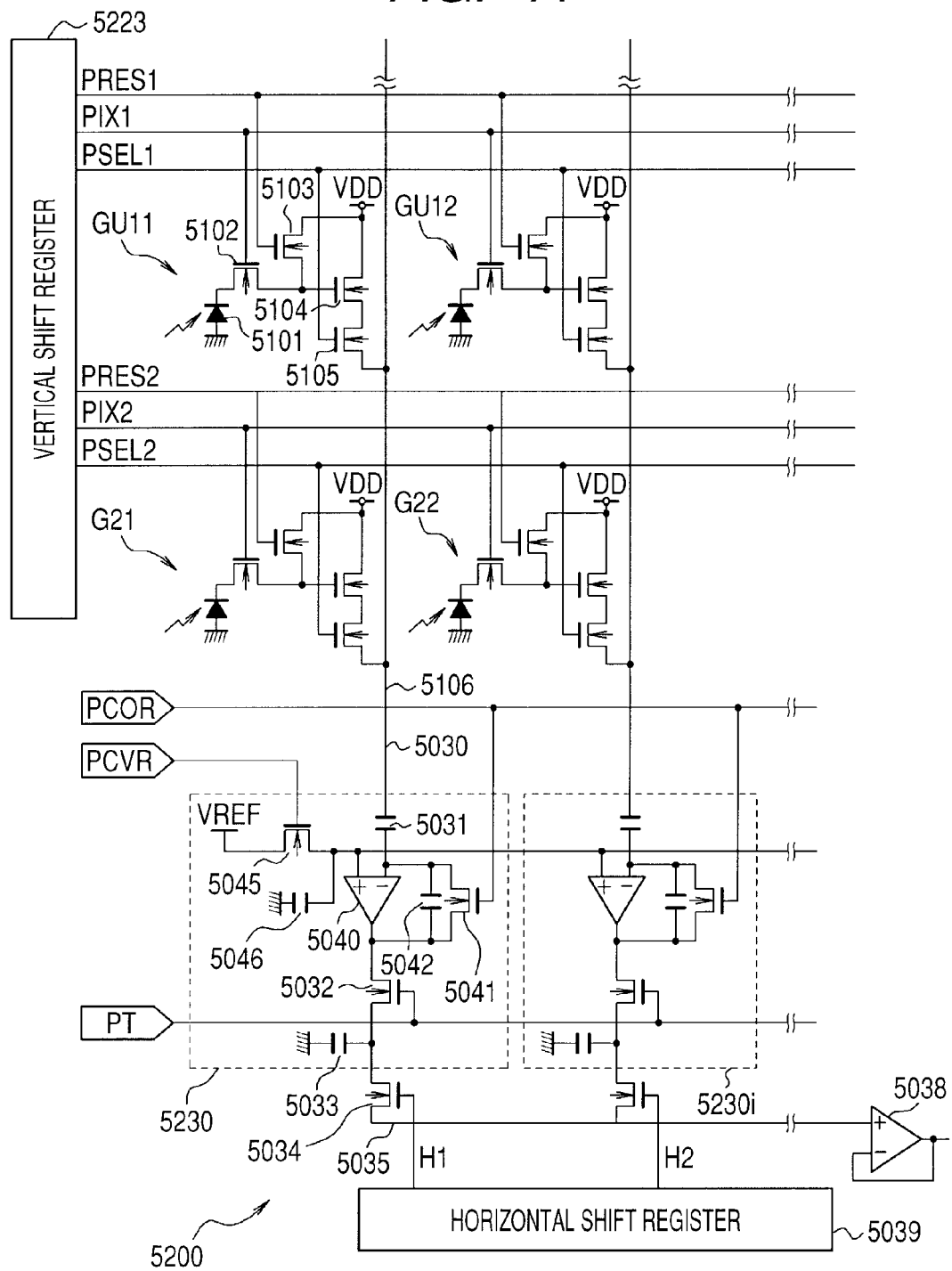
FIG. 11 is a structural diagram of a solid-state imaging apparatus according to a conventional technology.
Figure 12:
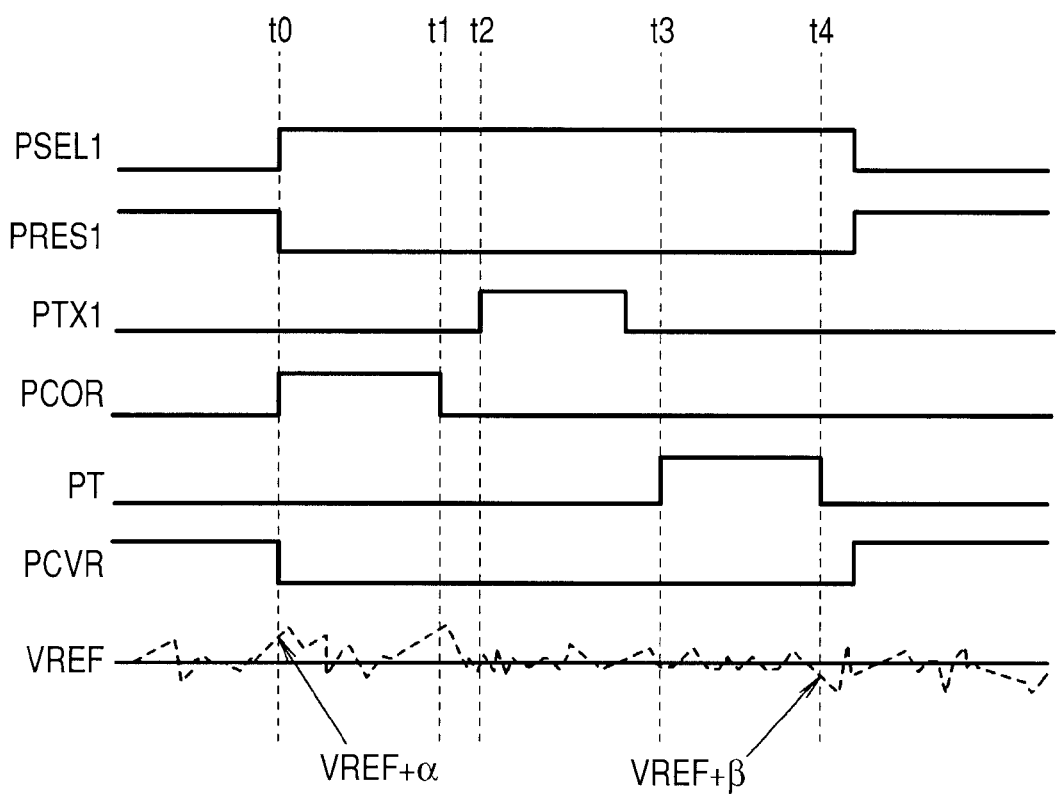
FIG. 12 is a solid-state timing chart of the solid-state imaging apparatus according to the conventional technology.

FIG. 10 is an arrangement diagram of a solid-state imaging apparatus according to a fourth embodiment of the present invention. The solid-state imaging apparatus includes the switching control unit 153, the power source circuits 141 and 142, the switching unit 115, the vertical scanning circuit 151, the capacitor 112, the driving buffer 109 and a pixel region 1001. A positional relation among the driving buffer 109, the capacitor 112 and the vertical scanning circuit 151 of FIG. 1, and the pixel region 1001 is illustrated in FIG. 10. The capacitor 112 is arranged so as to be elongated in a scanning direction of the vertical scanning circuit 151. With this structure, an area occupied only by the capacitor 112 can be reduced, with the result that a high quality image without lateral line noise can be provided at low cost.

When the other driving buffers 110 and 111 and the capacitors 113 and 114 are laid out similarly to FIG. 10, the same effect can be obtained. Further, whether the power source circuit is provided on an internal side or external side of the solid-state imaging apparatus, the same effect can be obtained.

According to the first to fourth embodiments, it is possible to provide the solid-state imaging apparatus in which lateral line noise caused by noise mixed in the control line for the pixels is eliminated.

In the solid-state imaging apparatus of each of FIG. 1 and FIG. 7, the plurality of pixels 101, 701 each include the photoelectric conversion unit 102 for photoelectric converting to generate a signal. The control lines 119 to 121, 719 to 721 supply the control signals for driving the pixels 101, 701. The driving buffers 109 to 111, 709 to 711 drive the control lines 119 to 121, 719 to 721. The switching units 115 to 117, 715 to 717 switch between a first path and a second path. The first path is a path for supplying the power source voltages from the power source circuits 141 to 146 to the power source terminals of the driving buffers 109 to 111, 709 to 711. The second path is a path for supplying the power source voltages from the capacitors 112 to 114, 712 to 714 to the power source terminals of the driving buffers 109 to 111, 709 to 711.

In FIG. 1, the pixels 101 each include the transfer switch 103, the reset switch 104, the pixel amplifier 105 and the selecting switch 106. The transfer switch 103 transfers the signal generated by the photoelectric conversion unit 102. The reset switch 104 resets the signal in the photoelectric conversion unit 102. The pixel amplifier 105 amplifies the signal transferred by the transfer switch 103. The selecting switch 106 selects a signal output from the pixel amplifier 105. The control lines 119 to 121 control the transfer switch 103, the reset switch 104 and the selecting switch 106.

In addition, the transfer switch 103, the reset switch 104 and the selecting switch 106 are MOS transistors. The control lines 119 to 121 are connected to gate electrodes of the transfer switch 103, the reset switch 104 and the selecting switch 106.

In FIG. 7, the pixels 701 each include: the transfer switch 103 for transferring the signal generated by the photoelectric conversion unit 102; the reset switch 104 for reset of the signal in the photoelectric conversion unit 102; and the pixel amplifier 105 for amplifying the signal transferred by the transfer switch 103. The control lines 719 to 721 control the transfer switch 103, the reset switch 104 and reset potentials of the reset switch 104.

In addition, the capacitors 112 to 114, 712 to 714 each have a power source voltage holding electrode and an electrode that is electrically connected to a reference voltage (for example, ground voltage) of the pixels 101, 701 and arranged in opposition to the power source voltage holding electrode.

In FIG. 2 and FIG. 8, the switching units 115 to 117, 715 to 717 select the second path during a pixel signal reading out period in which the signals are read out from the pixels 101, 701 to the outside of the pixels.

In addition, the switching units 115 to 117, 715 to 717 select the first path during a period except for the pixel signal reading out period.

In addition, the pixels 101, 701 each include: the transfer switch 103 for transferring the signal generated by the photoelectric conversion unit 102; and the reset switch 104 for reset of the signal in the photoelectric conversion unit 102. The control lines 119 and 120, 719 and 720 control the transfer switch 103 and the reset switch 104. The switching units 115 and 116, 715 and 716 select the first path at least during a period of controlling the reset switch 104, and a period of controlling the transfer switch 103.

In addition, the vertical output line 107 is an output line for outputting the signals from the pixels 101, 701. The column amplifier 126 amplifies the signals from the vertical output line 107. The switching units 115 to 117, 715 to 717 select the second path during the pixel signal reading out period, when the column amplifier 126 amplifies the signal in a gain larger than 1.

In addition, the pixels 101, 701 are arranged in a two dimensional matrix. Each of the capacitors 112 to 114, 712 to 714 is divided into plural ones each corresponding to each row of the matrix. The driving buffers 109 to 111, 709 to 711 are arranged each correspondingly to each row of the matrix. The driving buffers 109 to 111, 709 to 711 have the power source terminals connected one row by one row through the second path to the capacitors 112 to 114, 712 to 714.

In the solid-state imaging apparatus of each of FIG. 4, FIG. 5 and FIG. 9, the plurality of pixels 101, 701 each include the photoelectric conversion unit 102 for photoelectric converting to generate a signal. The control lines 119 to 121, 719 to 721 supply the control signals for driving the pixels 101, 701. The driving buffers 409 to 411, 709 to 711 drive the control lines 119 to 121, 719 to 721. The switching units 415 to 417, 715 to 717 switch between a first path and a second path. The first path is a path for supplying the control signals from the driving buffers 409 to 411, 709 to 711 to the control lines 119 to 121, 719 to 721. The second path is a path for supplying the control signals from the capacitors 412 to 414, 712 to 714 to the control lines 119 to 121, 719 to 721.

In FIG. 4 and FIG. 5, the pixels 101 each include the transfer switch 103, the reset switch 104, the pixel amplifier 105 and the selecting switch 106. The transfer switch 103 transfers the signal generated by the photoelectric conversion unit 102. The reset switch 104 resets the signal in the photoelectric conversion unit 102. The pixel amplifier 105 amplifies the signal transferred by the transfer switch 103. The selecting switch 106 selects a signal output from the pixel amplifier 105. The control lines 119 to 121 control the transfer switch 103, the reset switch 104 and the selecting switch 106.

In addition, the transfer switch 103, the reset switch 104 and the selecting switch 106 are MOS transistors. The control lines 119 to 121 are connected to gate electrodes of the transfer switch 103, the reset switch 104 and the selecting switch 106.

In FIG. 9, the pixels 701 each include: the transfer switch 103 for transferring the signal generated by the photoelectric conversion unit 102; the reset switch 104 for reset of the signal in the photoelectric conversion unit 102; and the pixel amplifier 105 for amplifying the signal transferred by the transfer switch 103. The control lines 719 to 721 control the transfer switch 103, the reset switch 104 and reset potentials of the reset switch 104.

In addition, the capacitors 412 to 414, 712 to 714 each have a power source voltage holding electrode and an electrode that is electrically connected to a reference voltage (for example, ground voltage) of the pixels 101, 701 and arranged in opposition to the power source voltage holding electrode.

In addition, the switching units 115 to 117, 715 to 717 select the second path during a pixel signal reading out period in which the signals are read out from the pixels 101, 701 to the outside of the pixels.

In addition, the switching units 115 to 117, 715 to 717 select the first path during a period except for the pixel signal reading out period.

In addition, the pixels 101, 701 each include: the transfer switch 103 for transferring the signal generated by the photoelectric conversion unit 102; and the reset switch 104 for reset of the signal in the photoelectric conversion unit 102. The control lines 119 and 120, 719 and 720 control the transfer switch 103 and the reset switch 104. The switching units 115 and 116, 715 and 716 select the first path at least during a period of controlling the reset switch 104, and a period of controlling the transfer switch 103.

In addition, the vertical output line 107 is an output line for outputting the signals from the pixels 101, 701. The column amplifier 126 amplifies the signals from the vertical output line 107. The switching units 115 to 117, 715 to 717 select the second path during the pixel signal reading out period, when the column amplifier 126 amplifies the signal in a gain larger than 1.

In addition, the pixels 101, 701 are arranged in a two dimensional matrix. Each of the capacitors 412 to 414, 712 to 714 is divided into plural ones each corresponding to each row of the matrix. The control lines 119 to 121, 719 to 721 are arranged each correspondingly to each row of the matrix, and connected one row by one row through the second path to the capacitors 412 to 414, 712 to 714.

According to the first to fourth embodiments, it is possible to prevent lateral line noise caused by noise mixed in the control line for the pixels.

It should be noted that all the embodiments described above are merely embodiment examples for carrying out the present invention, and thus the technical scope of the present invention should not be limitatively interpreted based on the embodiments. That is, the present invention can be variously carried out without departing from the technical ideas or principal features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-020135, filed Jan. 30, 2009, which is hereby incorporated by reference herein in its entirety.

What is claimed is:
1. A solid-state imaging apparatus comprising:
a plurality of pixels each including a photoelectric conversion unit to generate a signal;
a control line for supplying a control signal for driving the pixel;
a driving buffer for driving the control line; and
a switching unit for switching between a first path for supplying a control signal from the driving buffer to the control line and a second path for supplying a control signal from a capacitor to the control line.

2. The solid-state imaging apparatus according to claim 1, wherein
the pixel includes
a transfer switch for transferring the signal generated by the photoelectric conversion unit;
a reset switch for reset of the signal in the photoelectric conversion unit;
a pixel amplifier for amplifying the signal transferred by the transfer switch; and
a selecting switch for selecting a signal output from the pixel amplifier, and
the control line controls the transfer switch, the reset switch, and the selecting switch.

3. The solid-state imaging apparatus according to claim 1, wherein
the pixel includes
a transfer switch for transferring the signal generated by the photoelectric conversion unit;
a reset switch for reset of the signal in the photoelectric conversion unit; and
a pixel amplifier for amplifying the signal transferred by the transfer switch, and
the control line controls the transfer switch, the reset switch, and reset potentials of the reset switch.

4. The solid-state imaging apparatus according to claim 2, wherein
the transfer switch, the reset switch, and the selecting switch are MOS transistors, and
the control line is connected to gate electrodes of the transfer switch, the reset switch and the selecting switch.

5. The solid-state imaging apparatus according to claim 1, wherein
the capacitor has a power source voltage holding electrode and an electrode being at the same voltage as a reference voltage of the pixel and arranged in opposition to the power source voltage holding electrode.

6. The solid-state imaging apparatus according to claim 1, wherein
the switching unit selects the second path during a pixel signal reading out period in which the signal is read out from the pixel to an outside of the pixel.

7. The solid-state imaging apparatus according to claim 6, wherein
the switching unit selects the first path during a period except for the pixel signal reading out period.

8. The solid-state imaging apparatus according to claim 1, wherein
the pixel includes
a transfer switch for transferring the signal generated by the photoelectric conversion unit; and
a reset switch for reset of the signal in the photoelectric conversion unit,
the control line controls the transfer switch and the reset switch, and
the switching unit selects the first path at least during a period of controlling the reset switch, and a period of controlling the transfer switch.

9. The solid-state imaging apparatus according to claim 6, further comprising
a vertical output line for outputting the signal form the pixel, and
a column amplifier for amplifying the signal from the vertical output line,
wherein the switching unit selects the second path pixel during the signal reading out period, when the column amplifier amplifies the signal in a gain larger than 1.

10. The solid-state imaging apparatus according to claim 1, wherein
the pixels are arranged a two dimensional matrix,
the capacitor is divided into plural ones each corresponding to each row of the matrix, and
the control lines are arranged each correspondingly to each row of the matrix, and connected one row by one row through the second path to the capacitors.

* * * * *